United States Patent Office.

CONSTANTINE FAHLBERG AND CONRAD SEMPER, OF PHILADELPHIA, PENNSYLVANIA, ASSIGNORS TO JOHN HARRISON, GEO. L. HARRISON, JR., AND THOMAS S. HARRISON, ALL OF SAME PLACE.

RECOVERY OF PLUMBIC DIOXIDE FROM FERRUGINOUS SOLUTIONS.

SPECIFICATION forming part of Letters Patent No. 257,568, dated May 9, 1882.

Application filed November 23, 1881. (No specimens.)

*To all whom it may concern:*

Be it known that we, CONSTANTINE FAHLBERG and CONRAD SEMPER, both of the city of Philadelphia, State of Pennsylvania, have invented an Improved Method of Recovering or Purifying Waste or Spent Plumbic Dioxide Containing Iron, of which the following is a specification.

In our application for Letters Patent bearing even date herewith, for an improved method of removing iron from ferruginous solutions, we describe the use of plumbic dioxide in such ferruginous solutions, whereby the iron therein is precipitated as plumbate of iron.

The object of our present invention is to provide a method of recovery of said waste plumbic dioxide and plumbate of iron, by which said spent material is freed from iron and again rendered fit for use as plumbic dioxide, as set forth in the application for Letters Patent above referred to.

Our invention consists in treating such waste material with such agent as will remove the iron therefrom without destroying the plumbic dioxide, as is hereinafter described and claimed.

In order to revive the spent plumbic dioxide and to remove from it the iron, or to separate the plumbic dioxide from the said ferric plumbate and prepare it for a fresh application, it is, after washing it thoroughly to remove the adhering salt solutions, stirred up with dilute nitric acid, left to settle, and after removing the first liquor, which is an acid solution of nitrate of iron, washed for a sufficient time until the last traces of nitric acid are removed. The plumbic dioxide so recovered will be ready for use in the treatment of new ferruginous solutions.

The quantity of nitric acid is to be regulated by the quantity of iron to be removed. An excess is always desirable.

We do not confine ourselves to nitric acid alone for this revivification of the spent plumbic dioxide; but we can employ any other acid or agent which will remove the iron from the ferric plumbate without decomposing in the course of such treatment the freed plumbic dioxide.

Having thus described our invention, we claim—

The process of purifying waste plumbic dioxide and ferric plumbate produced in the process of precipitating iron from ferruginous solutions, which consists in treating said waste mass with nitric or other acid or acid-salt, for the removal of the iron therefrom, as specified.

In testimony whereof we have hereunto signed our names this 10th day of November, A. D. 1881.

CONSTANTINE FAHLBERG.
CONRAD SEMPER.

In presence of—
W. C. STRAWBRIDGE,
J. BONSALL TAYLOR.